Patented Mar. 14, 1944

2,343,925

UNITED STATES PATENT OFFICE 2,343,925

METALLIC FINISH ENAMEL

Ralph E. Pike, Yeadon, Pa., assignor to E. I. du Pont de Nemours & Company, Wilmington, Del., a corporation of Delaware No Drawing. Application December 31, 1941, Serial No. 425,231

6 Claims. (Cl. 260—21)

This invention relates to synthetic enamels and more particularly to baking synthetic metallic enamels and method of manufacture.

There has been a definite need for synthetic metallic enamels possessing the desirable application properties, brilliance and metallic effect common to metallic lacquers. The deficiencies of the synthetic metallic enamels have been recognized particularly in the automotive vehicle finishing industry where attempts have been made to use available synthetic metallic enamels. Such enamels, however, have been unsatisfactory because of their poor application properties and inferior appearance of the finished article to which the enamels were applied as compared to the metallic cellulose nitrate lacquers.

The problem of providing a satisfactory synthetic resin enamel is difficult since attempts to improve the application properties have resulted in still poorer appearance and attempts to improve the appearance of the films resulting from the application of the enamels have resulted in still further sacrifices in application properties. Synthetic metallic enamels are in many instances preferred to the use of metallic lacquers since lower cost solvents and diluents may be used. The synthetic metallic enamels also produce a higher gloss finish in the coatings resulting therefrom, so that a final polishing is usually not required. A satisfactory synthetic metallic enamel would be highly acceptable in the decorative and protective coating industry.

This invention presents as the principal object the provision of synthetic metallic enamels possessing satisfactory application properties and satisfactory metallic appearance in surface films produced therefrom.

Another object is the provision of synthetic metallic enamels which when applied to a suitable surface will produce films or coatings which are substantially free from "flooding" or "floating" which produce a mottled effect in the dry coating.

Still another object is the provision of such enamels which will produce films having an even metallic appearance and satisfactory "two-toneness."

A still further object is the provision of synthetic aluminum enamels possessing higher brilliance than similar enamels at present available.

Other objects will be apparent from the description of the invention which follows.

These and other objects are accomplished by providing an enamel composition in which the film-forming vehicle comprises essentially a synthetic resin or oleoresinous material together with a minor proportion of 12-hydroxystearin (glyceryl trihydroxy-stearate) introduced into the enamel composition in the form of a colloidal paste.

The invention may be more fully illustrated by the following examples, in which the parts are by weight.

EXAMPLE I

*Blue metallic enamel*

| | Parts |
|---|---|
| Aluminum flake pigment | .21 |
| Iron blue pigment | 4.00 |
| Alkyd resin A | 12.21 |
| Alkyd resin B | 52.99 |
| 12-hydroxystearin | .75 |
| Drier | .18 |
| Urea - formaldehyde - monohydric alcohol resin | 2.03 |
| Hydrocarbon solvent | 27.63 |
| | 100.00 |

Alkyd resin A is a 55% solution in hydrocarbon solvent of an approximately 52% linseed oil modified glyceryl phthalate.

Alkyd resin B is a 50% solution in hydrocarbon solvent of an approximately 35/14 linseed oil/Chinawood oil modified glyceryl phthalate.

The drier is a solution of manganese naphthenate in hydrocarbon solvent containing 3% metallic manganese.

The urea-formaldehyde-monohydric alcohol resin is in solution such as may be prepared according to U. S. 2,191,957. If desired, this resin may be replaced by an equivalent amount of alkyd resin A or B or other alkyd resins as hereinafter noted or by hydrocarbon solvent.

The hydrocarbon solvent is substantially a high solvency petroleum naphtha. Other hydrocarbon solvents or mixtures thereof may be used.

The 12-hydroxystearin (glyceryl trihydroxy stearate) is such as is producible by the catalytic hydrogenation of castor oil. It is used in preparing the enamel, in the form of a colloidal gel or paste which may be prepared according to the following procedure:

| | Parts |
|---|---|
| 12-hydroxystearin | 125 |
| Alkyd resin B | 2,500 |

The alkyd resin is heated to between 90–100° F. and the 12-hydroxystearin added with constant stirring. Stirring is continued until all the 12-hydroxystearin has dissolved. The mass is then allowed to cool whereupon the 12-hydroxystearin precipitates in colloidal form. To the mass is then added 1500 parts of high solvency petroleum naphtha and the entire mass then ground in a ball or pebble mill for approximately 48 hours. The gel or paste may then be strained by suitable means if necessary or desirable.

While the quantities of ingredients given above have been found to be satisfactory, they may be varied with equally satisfactory results and such variation will be readily apparent to those skilled in the art.

The 12-hydroxystearin, as previously noted, is used in preparing the enamel in the colloidal gel or paste form, the amount in the formula above, however, being solid material.

The enamel may be conveniently prepared by dispersing the iron blue pigment and the aluminum flake pigment in a part or the whole of the alkyd resin by suitable means and then adding the other ingredients under suitable agitation, sufficient of the 12-hydroxystearin gel or paste being added which will contain the equivalent of the solid material noted in the above compositions. Variations in the procedure for preparing the final enamel are well within the purview of the present invention and will be readily apparent to those skilled in the art of preparing such compositions.

The finished blue metallic enamel when applied to a suitably prepared surface, as a steel panel, and air dried (or flash dried) for 15-20 minutes and then baked for approximately 1 hour at 225° F., yields a finish which is markedly superior in brilliance, metallic effect and freedom from mottling or flooding than a similar composition containing no 12-hydroxystearin. The flash drying is essential for the most satisfactory or preferred results but the baking temperature may conveniently range between 225° F. and 275° F. with corresponding variations in the time of baking.

The above composition contains 3% of 12-hydroxystearin based on the resin solids.

Example II

Blue metallic enamel

| | Parts |
|---|---|
| Aluminum flake metal | .18 |
| Iron blue pigment | 3.31 |
| Alkyd resin A | 10.08 |
| Alkyd resin B | 41.36 |
| 12-hydroxystearin | 1.95 |
| Drier | .18 |
| Urea-formaldehyde-monohydric alcohol resin | 1.68 |
| Hydrocarbon solvent | 41.26 |
| | 100.00 |

The materials used were as described under Example I. The composition contains 6.9% 12-hydroxystearin based on the resin solids and was prepared according to the procedure described previously.

The finished blue metallic enamel when applied to a suitably prepared metal surface and air dried (or flash dried) for 15-20 minutes and then baked at 225° F. for one hour yields a finish which is satisfactory in application properties and has exceptional brilliance and metallic effect.

Example III

Gray metallic enamel

| | Parts |
|---|---|
| Aluminum flake pigment | .46 |
| Titanium dioxide | 8.10 |
| Lamp black | .46 |
| Alkyd resin A | 6.55 |
| Alkyl resin B | 61.61 |
| 12-hydroxystearin | 1.40 |
| Drier | .06 |
| Hydrocarbon solvent | 21.36 |
| | 100.00 |

The enamel is prepared in accordance with the procedure described under Example I. The finish produced with the composition possesses the properties obtained with the previously described enamels showing much greater brilliance and freedom from mottling resulting from flooding than metallic enamels used at present in the protective coating industry.

This enamel contains 4% 12-hydroxystearin based on the resin solids.

Example IV

Metallic aluminum flake enamel

| | Parts |
|---|---|
| Aluminum flake pigment | 2.12 |
| Alkyd resin B | 62.39 |
| 12-hydroxystearin | .64 |
| Drier | .13 |
| Urea-formaldehyde monohydric alcohol resin | 3.41 |
| Hydrocarbon solvent | 31.31 |
| | 100.00 |

The materials used were as described under Example I. The enamel may be conveniently prepared by adding the aluminum flake pigment to the alkyd resin, agitating and then adding the remaining ingredients with thorough agitation to produce the finished enamel.

When applied to a suitable metal base and baked as previously described, the enamel produces a brilliant metallic finish free from mottling. The metallic brilliance is decidedly superior to that produced by metallic enamels at present available.

This enamel contains 2% of 12-hydroxystearin based on the resin solids. Equally satisfactory results may be obtained with greater amounts, i. e., up to about 6% based on the resin solids.

While the present invention is particularly applicable to metallic enamels and colored metallic enamels, it is also broadly applicable to the preparation of so-called straight pigmented enamels imparting thereto certain highly desirable properties, particularly with respect to application properties and the quality of the finish obtained therewith. The following is such an enamel:

Example V

| | Parts |
|---|---|
| Blue lake pigment | 9.32 |
| Alkyd resin A | 20.79 |
| Alkyd resin B | 34.23 |
| 12-hydroxystearin | 1.14 |
| Oil soluble phenol-formaldehyde resin varnish | 1.31 |
| Drier | .35 |
| Hydrocarbon solvent | 32.86 |
| | 100.00 |

The oil soluble phenol-formaldehyde resin varnish is used as a wrinkling inhibitor. Other materials accomplishing the same result may be used in place thereof or in many instances the use of the wrinkled inhibitors may be omitted.

The enamel may be prepared by dispersing the pigment in a part or the whole of the alkyd resins, adding the 12-hydroxystearin in the form of the colloidal gel or paste and then adding the remaining ingredients under suitable agitation. Other means for preparing the enamel well known to those skilled in the art may also be used.

The finished enamel when applied to a suitably prepared metal surface by spraying or other conventional means and baked for approximately 1 hour at 225° F. produces a finish with satisfactory color and gloss. The principal advantage of the enamel over similar enamels containing no 12-hydroxystearin is markedly improved application properties. Another advantage is the mar resistant properties imparted to the finish produced therefrom. In addition where the pigments used normally cause floating or flooding, this objection is substantially eliminated.

Various types of synthetic resins and oleoresinous compositions, in addition to those given in the examples, may be used in the compositions of the present invention. Drying and semi-drying oil or fatty oil acid modified alkyd resins, commonly used in the synthetic enamel art, as well as generally accepted types of oleoresinous compositions prepared from drying or semi-drying fatty oils, may also be used.

In addition to the blue and grey colored metallic enamels given in the examples, the invention embraces the preparation of any colored enamel as well as metallic enamels containing no additional pigment. Such other pigments, as are commonly used in preparing decorative and protective coating compositions, may be used either alone or in admixture in preparing the colored metallic enamels or the solid colored enamels of the present invention.

The flake aluminum pigment may be used in the dry or paste form and is preferably added in preparing the enamels in the form of a slurry in a portion of the hydrocarbon solvent or thinner. In general, the percentage of flake aluminum or its equivalent, such as bronze, etc., should be present in amount of up to approximately 3% variation in the amount being governed to a large extent by the finish desired. The aluminum flake pigment may in certain instances be entirely eliminated.

The 12-hydroxystearin may be used in amount of between 1 and 8% based on the resinous or oleoresinous film-forming material with a preferred range of 2 to 4%. Amounts of less than 1% are ineffective and amounts greater than 8% impart an undesirable consistency to the compositions.

The enamels of the present invention are useful in the production of decorative and protective coatings where colored metallic, regular metallic or solid colored finishes are desired. They are particularly adapted for the finishing of automotive vehicle bodies, also to many other metallic articles, such as cash registers, calculating machines, desks and office equipment, heating equipment, etc.

The compositions may also be applied to other than metallic surfaces. They are preferably applied by spraying, but other well known means may be used, and then flash dried as previously described and finally baked or air dried, the latter being governed by the drying characteristics of the film-forming vehicle used. Specific temperature and time conditions for baking will be apparent to those generally familiar with such operations.

The compositions of the present invention have as the principal advantage over known synthetic resin and oleoresinous enamels markedly improved application properties and markedly improved appearance in the coatings produced therefrom. In the case of the colored metallic or straight metallic enamels markedly improved metallic appearance is obtained in finishes produced therefrom. A further advantage is the freedom from flooding or floating and thus the substantial absence of any mottled effect which is obtained in the present resin or oleoresin metallic enamels. Flooding or floating is also substantially eliminated in straight color enamels in which a combination of pigments which ordinarily cause floating or flooding is used.

A further advantage in the colored metallic enamels is the smooth, even metallic appearance and "two-toneness" which they produce and which is characteristic of the lacquer metallic compositions. The enamels of the present invention present as advantages over nitrocellulose lacquer enamel compositions, the use of lower cost solvents of the petroleum and coal tar type rather than the more expensive ester and ketone solvents required in the lacquer compositions and the production of a higher gloss finish which does not require polishing. Other advantages will be readily apparent from the use of the compositions.

It is apparent that many widely different embodiments of this invention may be made without departing from the spirit and scope thereof, and therefore, it is not intended to be limited except as indicated in the appended claims.

I claim:

1. A coating composition comprising a resin, metallic flake, and from 1 to 8% of 12-hydroxystearin.

2. The composition of claim 1 in which the hydroxystearin is present in amount between 2 and 4%.

3. The composition of claim 1 in which the resin is an alkyd resin modified with an oil having drying properties.

4. A coating composition comprising flake aluminum, a resin and from 1 to 8% of 12-hydroxystearin.

5. A coating composition comprising a metallic flake pigment, an oil modified alkyd resin, a small amount of urea-formaldehyde-monohydric alcohol resin, and from 2 to 4% of 12-hydroxystearin based on the resin solids.

6. The process of preparing metallic enamels which comprises preparing a colloidal gel of 12-hydroxystearin and an oil modified alkyd resin by heating the resin to about 100° F. and adding the 12-hydroxystearin slowly with stirring, allowing the mass to cool, whereupon the 12-hydroxystearin precipitates in colloidal form, mixing petroleum naphtha therewith, grinding and thereafter adding the mixture to an oil modified alkyd resin composition containing about 1% of flake aluminum and a colored pigment.

RALPH E. PIKE.